United States Patent
Bulbul et al.

(10) Patent No.: US 9,210,265 B2
(45) Date of Patent: Dec. 8, 2015

(54) EXPLORING MULTIPLE CONTACT CHANNELS TO DETERMINE POTENTIAL FOR REACHING CUSTOMERS

(71) Applicant: International Business Machines Corporation, Armonk, NY (US)

(72) Inventors: Ali A. Bulbul, Beaverton, OR (US); Chitra Dorai, Chappaqua, NY (US); Vidar Hrafnkelsson, Beaverton, OR (US); Alejandro Veen, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/928,410

(22) Filed: Jun. 27, 2013

(65) Prior Publication Data
US 2015/0003602 A1    Jan. 1, 2015

(51) Int. Cl.
*H04M 3/00* (2006.01)
*H04M 5/00* (2006.01)
*H04M 3/51* (2006.01)

(52) U.S. Cl.
CPC .......... *H04M 3/5175* (2013.01); *H04M 3/5191* (2013.01)

(58) Field of Classification Search
CPC ...... H04M 3/432; H04M 3/48; H04M 3/5183
USPC ............ 379/265.09, 265.05, 266.07, 266.08, 379/201.01, 201.1, 201.06, 207.12
See application file for complete search history.

(56) References Cited

U.S. PATENT DOCUMENTS

| | | | |
|---|---|---|---|
| 5,889,799 A | 3/1999 | Grossman et al. | |
| 7,373,410 B2 * | 5/2008 | Monza et al. | 709/229 |
| 7,555,108 B2 | 6/2009 | Sylvain | |
| 7,603,411 B1 | 10/2009 | Davies et al. | |
| 7,873,157 B1 | 1/2011 | Sim | |
| 2006/0075091 A1 | 4/2006 | Beyda et al. | |
| 2009/0070129 A1 * | 3/2009 | Inbar et al. | 705/1 |
| 2009/0168977 A1 | 7/2009 | Galvin | |
| 2010/0077033 A1 | 3/2010 | Lowry | |
| 2010/0318486 A1 | 12/2010 | Stafford et al. | |
| 2013/0060587 A1 * | 3/2013 | Bayrak et al. | 705/7.11 |

OTHER PUBLICATIONS

C. J. Clopper et al , "The Use of Confidence or Fiducial Limits Illustrated in the Case of the Binomial", Biometrika, vol. 26, No. 4, (Dec. 1934), pp. 404-413.

* cited by examiner

*Primary Examiner* — Thjuan K Addy
(74) *Attorney, Agent, or Firm* — Reza Sarbakhsh; Daniel P. Morris (57) ABSTRACT

Improving right party contact rates with a customer by exploring available contact channels and time periods may include periodically reviewing that customer's contact information to determine a set of exploration scores for each contact channel and time period pair of that customer, using an exploration score function based on an unexplored potential value, a contact utilization value, and a need-to-explore value for that contact channel and time period pair.

20 Claims, 5 Drawing Sheets

| customer | contact channel | time period | n | r | $n_w$ | $r_w$ | f |
|---|---|---|---|---|---|---|---|
| customer 1 | C | Mo | 29 | 0 | 22.645 | 0.000 | 0.0500 |
| customer 1 | C | Lu | 33 | 1 | 26.660 | 0.694 | 0.0500 |
| customer 1 | C | An | 25 | 0 | 22.320 | 0.000 | 0.0500 |
| customer 1 | C | Ev | 68 | 1 | 56.242 | 0.669 | 0.0500 |
| customer 1 | H | Mo | 0 | 0 | 0.000 | 0.000 | 0.8100 |
| customer 1 | H | Lu | 0 | 0 | 0.000 | 0.000 | 0.8100 |
| customer 1 | H | An | 0 | 0 | 0.000 | 0.000 | 0.8100 |
| customer 1 | H | Ev | 4 | 0 | 3.930 | 0.000 | 0.4412 |
| customer 1 | O | Lu | 0 | 0 | 0.000 | 0.000 | 0.8100 |
| customer 1 | O | An | 1 | 0 | 0.980 | 0.000 | 0.8080 |
| customer 1 | O | Mo | 1 | 0 | 0.997 | 0.000 | 0.8080 |
| customer 1 | O | Ev | 2 | 0 | 1.974 | 0.000 | 0.7883 |
| customer 2 | C | Mo | 66 | 28 | 52.277 | 21.818 | 0.0500 |
| customer 2 | C | Lu | 24 | 8 | 19.380 | 6.557 | 0.0500 |
| customer 2 | C | An | 8 | 1 | 6.156 | 0.792 | 0.0522 |
| customer 2 | C | Ev | 8 | 0 | 5.832 | 0.000 | 0.0527 |
| customer 2 | H | Mo | 1 | 1 | 0.604 | 0.604 | 0.0610 |
| customer 2 | H | Lu | 1 | 0 | 0.676 | 0.000 | 0.0827 |
| customer 2 | H | An | 2 | 0 | 1.238 | 0.000 | 0.0826 |
| customer 2 | H | Ev | 2 | 0 | 1.452 | 0.000 | 0.0825 |
| customer 3 | C | Mo | 8 | 0 | 6.954 | 0.000 | 0.0889 |
| customer 3 | C | Lu | 7 | 0 | 4.072 | 0.000 | 0.2173 |
| customer 3 | C | An | 9 | 0 | 6.057 | 0.000 | 0.0733 |
| customer 3 | C | Ev | 6 | 0 | 4.031 | 0.000 | 0.2222 |
| customer 3 | H | Lu | 10 | 0 | 8.357 | 0.000 | 0.0500 |
| customer 3 | H | Lu | 17 | 0 | 12.264 | 0.000 | 0.0500 |
| customer 3 | H | Mo | 31 | 0 | 25.025 | 0.000 | 0.0500 |
| customer 3 | H | An | 79 | 0 | 61.383 | 0.000 | 0.0500 |

EXPLORING MULTIPLE CONTACT CHANNELS TO DETERMINE POTENTIAL FOR REACHING CUSTOMERS

FIELD

The present application relates generally to computer applications and more particularly to exploring channels of communication at various time periods to determine their potential for improving right party contact and increasing interaction likelihood.

BACKGROUND

Enterprises having a substantial portion of their business conducted using front office operations for sales, support, account management, etc., may become more client centric by leveraging sophisticated customer insights to improve risk management, contact channel performance and customer satisfaction. Insightful operations also may allow for continuously tailoring services offered to changing customer needs. To succeed in the market place, front office operations of businesses need to strengthen customer relationships and improve customer experience in the different contact channels in a multi-channel environment. Most often, this requires increasing the quality and quantity of productive interactions with the customers. Fundamental to this is the ability to have insights about the customers such that customers can be reached at their preferred, convenient time and contact channel. This is especially the case when businesses and organizations need to reach out and initiate a contact with their customers and clients (outbound contact attempts) or simply return customer contacts as part of their customer relationship management.

Modern contact centers can handle a multitude of contact channels, such as phone, text messaging, e-mail, instant messaging (web chat including on social networks), telefax, and postal mail. Some of these contact channel types can have more than one instance or subtypes; for example, there may be several instances of phone channels, such as home, work, cell phone, etc. and there may be different instances of e-mail addresses, such as private and work email addresses.

Traditionally, the timing of customer contact attempts is based on staffing capacity, customer segments, and risk priorities, and may be guided by "typical" or "expected" behavior. In the call center industry, customers are increasingly asked about their preferred time to be contacted. While this information is collected, there is not always a systematic way of analyzing or using the collected information. In addition, the call/response patterns at the individual level are rarely utilized to guide outbound notifications. System operations such as interactive voice response units (IVRs) or the like may not be set up to ensure that contacts are always made during the most convenient/preferred time for all customers increasing the likelihood that dials are converted to successful customer interactions and hence, favorable business outcomes. Contacting customers at inconvenient times or at plain unavailable times lead to wasted contact attempts, poor customer experience, dissatisfied customers and a loss of business revenue as the opportunity to convert a call/contact into business value such as a sale or obtaining a payment is lost. Often, when outbound contact campaigns are made, the phone calls are picked up by parties who are not authorized to discuss the matter, which leads to enormous waste of resources and delayed resolution. The ability to increase right party contact and the ability to have an interaction enhances all front office operations.

According to an aspect of the prior art, right party contact (RPC) rates may be improved using observed and modeled patterns of customer behavior. These observed and modeled patterns of customer behavior may be implemented using a Best Time To Contact model (BTTC), which makes contact attempts using an exploitative model; i.e., it uses contact and behavior information already in its possession to determine the best contact channel/time period to use in attempting to contact a customer or client. According to one aspect of the BTTC model's exploitative approach, a set of customer-specific historical contact data may be used to estimate a statistical model which computes a score for determining a successful contact with each customer using a means for contact at a particular time period. This model, developed using historical customer data, may be modified based on additional customer data that may become available as the model is used to attempt contacting the customer. The output of the BTTC model may be used to schedule a number of contacts over a period of time.

BRIEF SUMMARY

A method for evaluating contact information, according to an embodiment of the disclosed invention, includes selecting a plurality of contacts having a plurality contact channels and time periods. The method determines a set of exploration scores for each one of the plurality of contacts using the corresponding contact channels and time periods, and presents the set of exploration scores to a recipient for making a contact attempt to each of the plurality of contacts. At least one of the above steps is performed using a computer.

A system for evaluating contact information, according to a further embodiment of the disclosed invention, includes a computer having a processor and a computer-readable storage device, and a program embodied on the storage device for execution by the processor. The program has a plurality of program modules, including a selecting module configured to select a plurality of contacts having a plurality of contact channel and time periods. The program further includes a determining module configured to determine a set of exploration scores for each of the plurality of contacts using the corresponding contact channels and time periods. The program also includes a presenting module configured to present the set of exploration scores to a recipient for making a contact attempt to each of the plurality of contacts.

A computer program product for evaluating contact information, according to a further embodiment of the disclosed invention, includes a computer-readable storage medium having program code embodied therewith, the program code being readable/executable by a processor of a computer. The program is configured to perform a method including multiple steps executed by the processor. One step includes selecting a plurality of contacts having a plurality of contact channels and time periods. A further step includes determining a set of exploration scores for each of the plurality of contacts using the corresponding contact channels and time periods. Another step includes presenting the set of exploration scores to a recipient for making a contact attempt to each of the plurality of contacts.

Further features as well as the structure and operation of various embodiments are described in detail below with reference to the accompanying drawings.

BRIEF DESCRIPTION OF THE SEVERAL VIEWS OF THE DRAWINGS

Drawings depicting exemplary embodiments of the disclosed invention are referenced herein. In the drawings, like reference numbers indicate identical or functionally similar elements.

DETAILED DESCRIPTION

Figure 1:
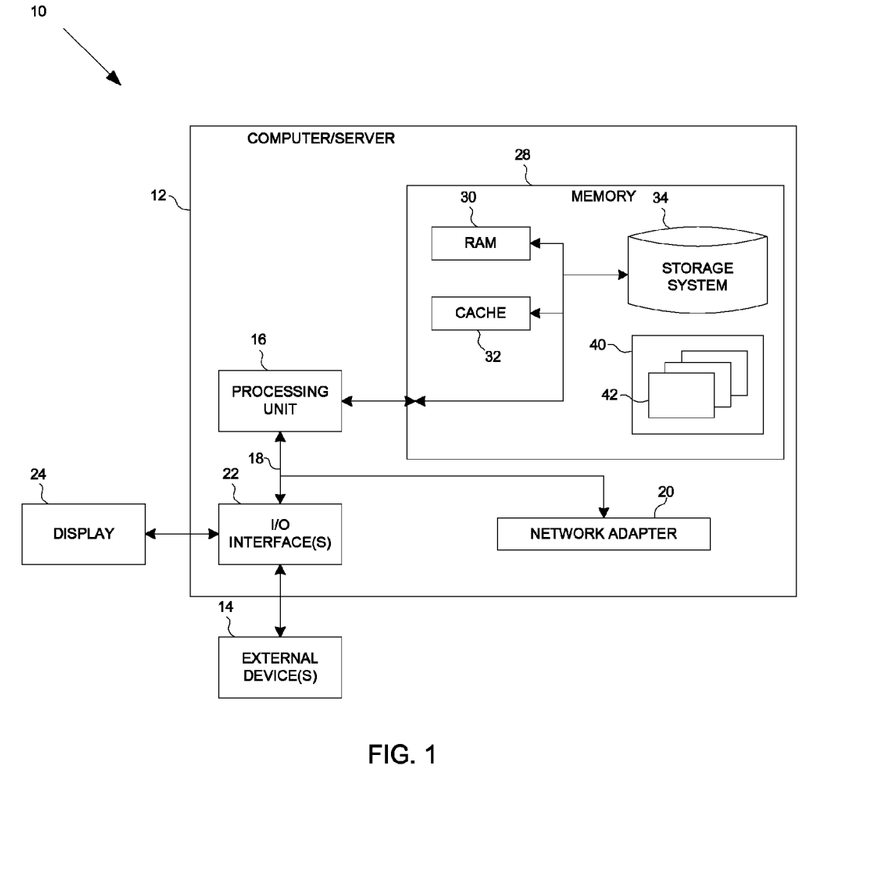
FIG. 1 is a schematic block diagram of an embodiment of a computer system for implementing a method, in accordance with an embodiment of the invention.

Referring to FIG. 1, a schematic of an exemplary computing system is shown. The computer system 10 is one example of a suitable computer system and is not intended to suggest any limitation as to the scope of use or functionality of embodiments of the invention described herein.

In the computer system 10, shown in FIG. 1, a computer/server 12 is operational with numerous other general purpose or special purpose computing system environments or configurations. Examples of well-known computing systems, environments, and/or configurations that may be suitable for use with the computer/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer/server 12 may be described in the general context of computer system-executable instructions, such as program modules, being executed by the computer system 10. Generally, program modules may include routines, programs, objects, components, logic, data structures, and so on that perform particular tasks or implement particular abstract data types. The computer/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer/server 12 in the computer system 10 is shown in the form of a general-purpose computing device. The components of the computer/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 12 typically includes a variety of computer system readable media. Such media may be any available media that is accessible by the computer/server 12, and it includes both volatile and non-volatile media, removable and non-removable media.

The system memory 28 can include computer system readable media in the form of volatile memory, such as random access memory (RAM) 30 and/or cache memory 32. The computer/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

The program/utility 40, having a set (at least one) of program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer/server 12 may also communicate with one or more external devices 14 such as a keyboard, a pointing device, a display 24, etc.; one or more devices that enable a user to interact with the computer/server 12; and/or any devices (e.g., network card, modem, etc.) that enable the computer/server 12 to communicate with one or more other computing devices. Such communication can occur via Input/Output (I/O) interfaces 22. Still yet, computer the system/server 12 can communicate with one or more networks such as a local area network (LAN), a general wide area network (WAN), and/or a public network (e.g., the Internet) via a network adapter 20. As depicted, the network adapter 20 communicates with the other components of the computer/server 12 via the bus 18. It should be understood that although not shown, other hardware and/or software components could be used in conjunction with the computer/server 12. Examples, include, but are not limited to: microcode, device drivers, redundant processing units, external disk drive arrays, RAID systems, tape drives, and data archival storage systems, etc.

Figure 2:
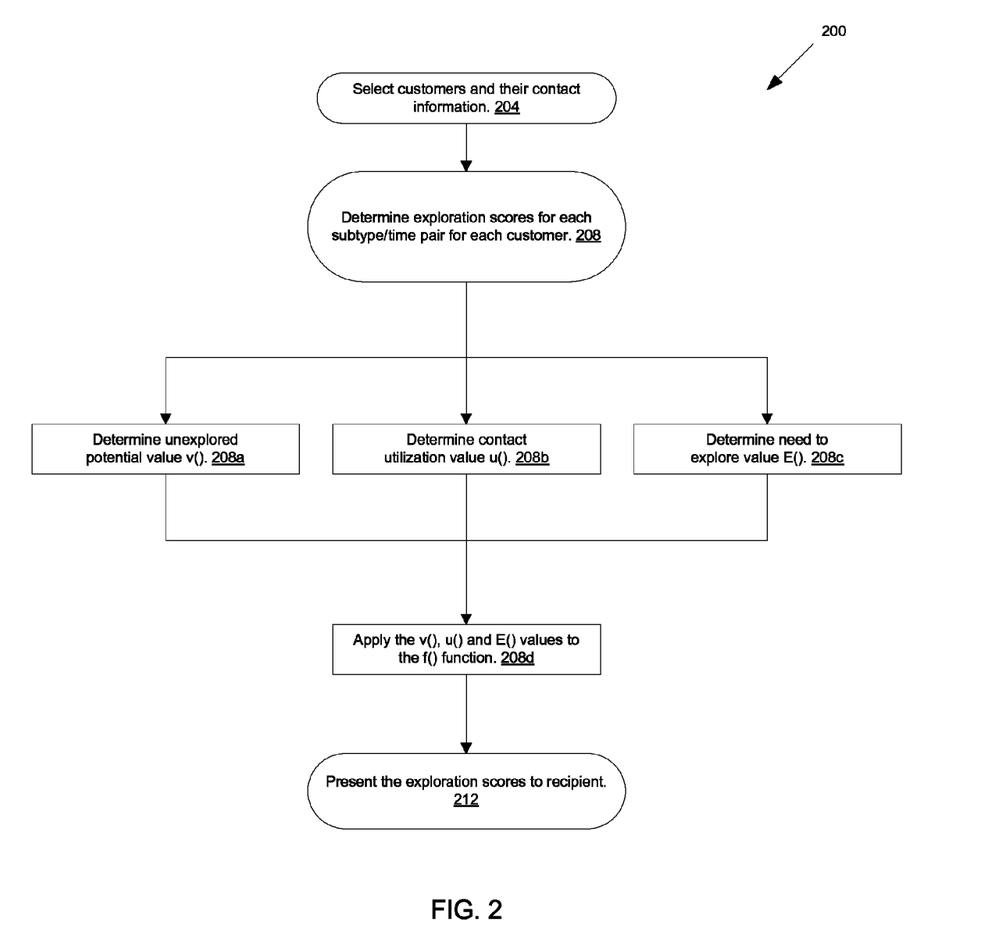
FIG. 2 is a flow chart depicting the steps of a method for determining a set of exploration scores, in accordance with an embodiment of the invention.
Figure 3A:
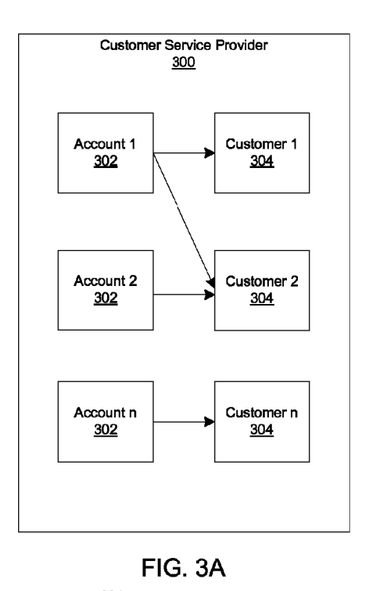
FIG. 3A is a schematic block diagram depicting a customer service provider having a plurality of accounts and customers, in accordance with an embodiment of the invention.
Figure 3B:
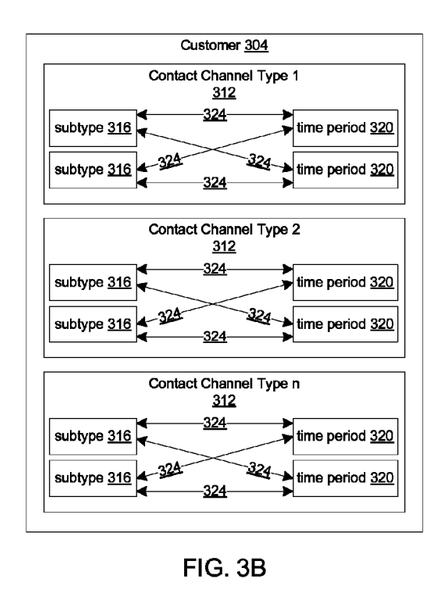
FIG. 3B is a schematic block diagram depicting contact information associated with each customer depicted in FIG. 3A, in accordance with an embodiment of the invention.

Referring now to FIGS. 2-3B, a method 200 according to an exemplary embodiment of the disclosed invention may be implemented using a computer system/server 10, as described in detail in connection with FIG. 1, to increase a customer service provider's 300 RPC rates with a plurality of contacts through an exploratory model. The plurality of contacts may be, for example, the customer service provider's 300 customers 304 (for example, customers 1-*n*), or any other individual or entity that the customer service provider 300 may wish to reach. A contact may be defined, generally, by its dictionary definition as well as any person or entity with which embodiments of the disclosed invention may communicate. A contact attempt may include using one or more contact channel types 312 or channel subtypes 316 during a time period 316 to reach a customer 304. According to this embodiment, each customer 304 may maintain one or more accounts (for example, accounts 1-n) with the customer service provider 300. Each account 302, in turn, may be associated with one or more customers 304. In the example depicted in FIG. 3A, Account 1 is associated with Customers 1 and 2, and Account 2 is associated with Customer 2. In step 204, the method 200 may identify the customer service provider's 300 customers 304 and their contact information from a data source (for example, the storage system 34 shown in FIG. 1, a database, or a cloud service).

With continued reference to FIGS. 2-3B, information on each customer 304 that the method 200 may identify in step 204 may include, without limitation, information about one or more available contact channel types 312 (for example, Contact Channel Types 1-n), and corresponding information on one or more channel subtypes 316 and one or more time periods 320. A contact channel type 312 may be defined as a means for communication. According to one embodiment of the disclosed invention, a contact channel type 312 may comprise one or more channel subtypes 316. For example, a telephone channel type 312 may be available to communicate with a customer 304; the customer 304 may be reachable through multiple telephone numbers, each of which may be a channel subtype 316. However, other embodiments of the disclosed invention may operate without distinguishing between channel types and subtypes. The quality of a contact channel (including channel type and/or subtype), including its accuracy and reliability, is not relevant to its designation of as being available for use by embodiments of the disclosed invention.

With continued reference to FIGS. 2-3B, according to exemplary and non-limiting embodiments of the disclosed invention, a time period 320 may be defined as: a specific time within a 24-hour period (e.g. 8:00 a.m.); a period in a 24 hour day (e.g. morning, defined as 8:00-11:59 a.m.); day-of-week (e.g. Monday); week period (e.g. weekday or weekend; business day or holiday); season (e.g. spring); or a time before or after an event (e.g. 24 hours before anticipated service disruption; 2 minutes after login on a computer network). The particular definition of a time period 320 depends on the particular embodiment in which the disclosed invention is used, and may be configurable by a user to suit specific or changing needs. Furthermore, defined time periods 320 may be combined to define additional, more granular time periods. For example, in one embodiment, two categories of time periods 320 may be defined as follows: (1) morning, lunch, afternoon, and evening hours (each corresponding to 8:xx-10:xx, 11:xx-13:xx, 14:xx-16:xx, and 17:xx-20:xx in military time, respectively, determined as of a customer's 304 local time); and (2) day of the week (corresponding to Monday through Sunday). These two categories may be used in combination, so that it is possible for the method 200 to distinguish, where desired, between more specific time periods 320, such as Monday morning and Tuesday afternoon. Selecting a particular granularity for a time period 320 does not require that all other time periods 320 be defined at the same granularity. For example, the method 200 may distinguish, for a given customer 304, between Monday morning versus other weekdays in carrying out its steps and accomplishing its objectives.

With continued reference to FIGS. 2-3B, each channel subtype 316 may be paired with each time period 320 (or combinations of time periods 320) within a given contact channel type 312 to form a channel subtype/time period pair 324 (hereinafter referred to as a "subtype/time pair 324"). According to one embodiment, the number of subtype/time pairs 324 within each contact channel type 312 may be derived by multiplying the number of available channel subtypes 316 by the number of available time periods 320 within that contact channel type 312. Other embodiments of the disclosed invention may define the subtype/time pairs 324 with fewer or more possibilities, and such definitions may be made configurable by a user. For example, the customer service provider 300 may have a cell phone number and a work phone number for a particular customer 304. Although the customer service provider 300 may have the means to place calls outside of business hours to any phone number, it may choose never to do so for a work number. In such a case, the customer service provider 300 may choose not to use a subtype/time pair 324 corresponding to that customer's 304 work phone number and after-business-hours time periods. Similarly, the customer service provider 300 may decide not to define or use a particular subtype/time pair 324 when requested by a customer 304. For example, a customer 304 may request that the service provider 300 not call the customer on a cell phone number except in the case of an emergency. The customer service provider 300 may configure the pairing of the subtype/time pairs 324 in step 204 of the method 200. According to yet another embodiment, the method 200 may identify customers 304 and contact channel types 312 (and the associated pairing information) from records in a database. In other words, it is not essential that the method 200 perform the actual processing of the customer 304 preferences.

Referring now to FIGS. 3A-B, the available time periods 320 within a given contact channel type 312 may be defined independently of those in other contact channel types 312. The definition of a time period 320 for a given contact channel type 312 may be informed by many factors, including, without limitation: the way the contact channel type 312 is typically used by customers 304 (for example, customers may not care about what time they receive an email, whereas they may care a great deal if they are called during late night or early morning hours); availability of resources (for example, live operators may not be available to handle phone calls around the clock, whereas automated e-mails may be sent at any time); and cost.

With continued reference to FIGS. 3A-B, time periods 320 may be defined in narrower and more complex terms than those described above without departing from the spirit or scope of the disclosed invention. For example, in the case of a home telephone number, the time periods 320 may be defined as weekday/weekend and time of day combinations, such as: Monday morning, Monday lunch . . . Tuesday morning, Tuesday lunch . . . , Sunday morning, Sunday lunch . . . . In this example, the method 200 may determine an exploration score for the home telephone number paired with each of the narrow time periods defined. The choice of the breadth of the time period 320 definition depends on many factors, including whether it is feasible for the customer service provider 300 to perform the method 200 for all available combinations for all its customers 304, whether doing so in the past has proved useful, etc.

Referring now to FIGS. 2-3B, pairing each channel subtype 316 with each time period 320 within the same contact channel type 312 allows the method 200 to assess (in steps described in greater detail below) the quality and usefulness of channel subtypes 316 across channel types 312 and across time periods 320, making the available information more granular. Without this granularity, the customer service provider 300 may not realize, for example, that the best way to contact a particular customer 304 might be by calling the customer's 304 cell phone on a weekend morning, if the telephone contact channel type 312 as a whole has led to a low RPC rate for that customer 304. The granularity of the information also allows the customer service provider 300 to determine which subtype/time pair 324 to use for making exploitative vs. exploratory contact attempts.

Referring now to FIGS. 3A-B, the particular form in which the customers' 304 contact information is depicted is intended to communicate the type and range of contact information that the customer service provider 300 may maintain for its customers, and is in no way intended to limit the organization of such information to the depicted embodiment. For example, it is not necessary that channel subtype 316 and time period 320 information be compartmentalized into contact channel type 312 entries. Where an object oriented programming language is used to implement the method 200 on a computer system 10 described in FIG. 1, for example, contact information may be stored as contact channel type 312 objects having channel subtype 316 and time period 320 properties; alternatively (and without limitation), such contact information may be stored as channel subtype 316 objects having contact channel type 312 and time period 320 properties. Other embodiments may not necessarily maintain information on contact channel types 312, and may instead distinguish only between channel subtypes 316 and time periods 320 for purposes of determining exploration scores. In more practical terms, the method 200 may determine that there is a higher probability to reach a customer 304 by email on a weekend as compared to using the customer's 304 cell phone number during a week day afternoon. In other words, the exploration scores may be globally applied, and channel subtype/time pairs 324 may be assessed globally irrespective of their contact channel types 312. Additionally, the depicted form of the customer 304 contact records is non-limiting in that the customer service provider 300 may organize its contact information records by account number, rather than by customer 304 identities.

With continued reference to FIGS. 3A-B, the customer 304 contact information need not contain information about every contact channel 312 that the customer service provider 300 is equipped to use. Rather, the customer contact record 324 may contain information about only those contact channel types 312 or channel subtypes 316 known to the customer service provider 300 through which a given customer 304 may be reachable. Additionally, the customer 304 contact information may be updated manually or through an automated process, or both. This may occur, for example, when a customer's 304 contact information changes, or when the customer service provider 300 expands or reduces the contact channel types 312, channel subtypes 316, or time periods 320 it uses to contact its customers 304. Such changes, on the part of the customer service provider 300, may be due to a variety factors including, without limitation: a change in applicable legal regulations, resource availability, or expected or modeled RPC rates.

With continued reference to FIGS. 3A-B, the choice of contact channel types 312, channel subtypes 316, and time periods 320 depend on several factors including availability, cost, and need. Fewer or more channel contact types 312, channel subtypes 316, and/or time periods 320 may be utilized in other embodiments of the disclosed invention without departing from its spirit or scope. For example, in a geographic area where there is no reliable internet infrastructure, e-mail or instant messaging may not be a suitable choice for a contact channel type 312. Similarly, where the disclosed invention is used as an e-marketing tool, for example, a telephone contact channel type 312 may not be appropriate.

Figure 3C:
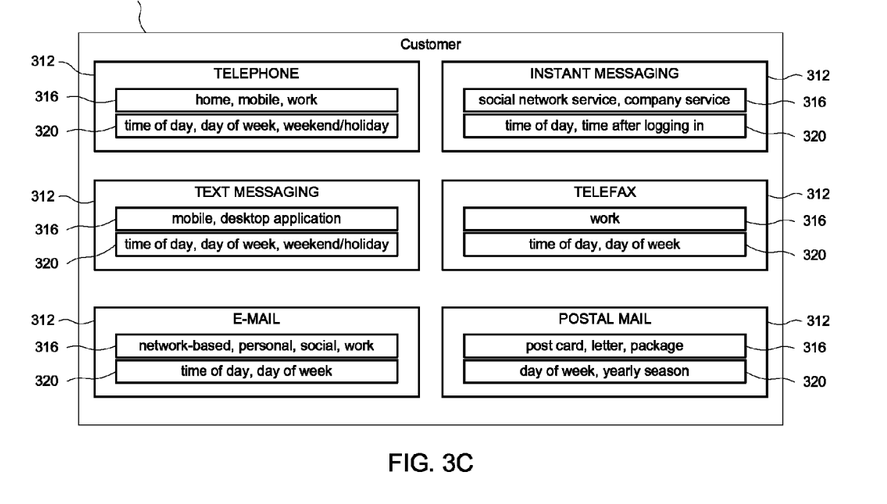
FIG. 3C is a schematic blog diagram depicting an exemplary embodiment of the contact information for the customers depicted in FIGS. 3A-B, in accordance with an embodiment of the invention.

Referring now to FIG. 3C, an example of a set of customer 304 contact information (depicted more generally in FIG. 3B) may include information for six contact channel types 312 having one or more channel subtypes 316 and time periods 320, as follows: (1) a telephone contact channel type 312 having home, mobile, and work channel subtypes 316 (i.e., telephone numbers), and time of day, day of week, weekend/holiday time periods 320; (2) a text message or SMS contact channel type 312 having a mobile channel subtype 316 (i.e., numbers), and time of day, day of week, weekend/holiday time periods 320; (3) an e-mail contact channel type 312 having network-based, personal, social, and work channel subtypes 316 (i.e., email addresses), and time of day, day of week time periods 320; (4) an instant messenger contact channel type 312 having social network service and company service channel subtypes 316 (i.e., chat IDs, which may be telephone numbers), and time of day and time after logging-in time periods 320 (e.g., customer service provider could initiate chat 30 seconds after a customer's 304 login or webpage visit); (5) a telefax contact channel type 312 having home and work channel subtypes 316 (i.e., numbers), and time of day and day of week time periods 320; and (6) a postal mail contact channel type 312 having post card, letter, and package channel subtypes 316 (i.e., parcel type), and day of week and yearly season time periods 320 (in other embodiments, the channel subtypes 316 of the postal mail contact channel type 312 may be differentiated by address type, such as residential, business, local, international, vacation, etc.).

Referring now to FIGS. 2 and 3C, according to the disclosed embodiment, the instant messaging contact channel type 312 described above may be used in the following manner: a customer 304 may access the customer service provider's 300 website by logging into an online account. The customer service provider 300 may determine (for example, through the method 200) that the customer 304 has been logged on for an extended period of time (e.g. more than 5 minutes) and browsed more than a predetermined number of web pages (e.g. 20), suggesting that the customer 304 is not finding sought after information. The customer service provider 300 may initiate a chat session with the customer 304 through the customer 304's browser in order to provide assistance.

With continued reference to FIGS. 2 and 3C, according to the disclosed embodiment, the postal mail contact channel type 312 described above may be used in the following manner: the customer service provider 300 may communicate with a customer 304 by initiating a mailing of a post card, letter, or package (each being exemplary embodiments of a postal mail channel subtype 316), temporally differentiated in days of the week or yearly seasons. A successful contact in the case of this contact channel type 312 may be defined, for example, as the customer 304 performing a predefined action based on the mailing. For example, and without limitation, the mailing may include instructions on replying by mail or by accessing a website and creating an online account. The customer service provider 300 may treat such actions as RPCs, whereas a lack of action on the customer's 304 part may be treated as a non-RPC.

Referring now to FIGS. 2-3C, the method 200 may use the information it identifies in step 204 to determine a set of exploration scores for each customer 304, in step 208. The method 200 may perform this step by analyzing each subtype/time pair 324 for each contact channel type 312 that is available for that customer 304. According to one embodiment of the disclosed invention, the method 200 may do so by using an exploration score function $f(\ )$. The exploration score $f(\ )$ value for a given subtype/time pair 324, such as a cell phone number paired with a morning time period, is a metric indicating how strongly the disclosed invention recommends making an exploratory contact attempt to the customer 304 using that channel subtype/time pair. Where the BTTC model allows the customer service provider 300 to determine the best time to contact its customers 304 based on existing information it has about their contact habits and preferences, the exploratory model of the disclosed invention enables the customer service provider 300 to discover such habits and preferences where little to no information exists about them. The exploratory model of the disclosed invention also enables the customer service provider 300 to discover changes in such habits and preferences over time, even for those subtype/time pairs 324 for which information already exists.

With continued reference to FIGS. 2-3C, according to an embodiment of the disclosed invention, the method 200 may determine the set of exploration scores for each customer 304 using $f(\ )$ in step 208, by determining, for each subtype/time pair 324 for that customer 304: an unexplored potential value v( ) in step 208a; a contact utilization value u( ) in step 208b; and a need-to-explore value E( ) in step 208c. These v( ), u( ), and E( ) values may be used to arrive at an exploration score for a given subtype/time pair 324, and may further include (according to an embodiment of the disclosed invention) an exploration criteria, as follows:

$$f(u(\ ), v(\ ), E(\ )) = C + E(\ ) \cdot \frac{1 - C}{1 + \exp\left(-A \cdot \left(D \cdot v(\ ) - \frac{u(\ )}{B}\right)\right)}$$

The parameters A, B, C, and D are tuning parameters that may be included in the exploration function to allow varying emphasis on different inputs to $f(\ )$. Other embodiments of the disclosed invention may utilize different functions or different parameters, without departing from the scope or spirit of the exploratory model of the disclosed invention. For example, the customer service provider 300 may determine to ignore or place particular emphasis on various aspects of the exploration function, or to use the result of the exploration function as an input to another function. The use of the exploration criteria allows the disclosed invention to be modified by user configuration. The exploration criteria may define the relationship in which the v( ), u( ), and E( ) values are used. The effects of using the parameters disclosed in this embodiment are described below in greater detail.

Parameters A, B, C, and D are defined as follows. Parameter A controls the shape of the exploration score curve: a higher A value results in a higher exploration score for a given unexplored potential value and contact utilization value. Parameter B controls the sensitivity of the exploration score curve to changes in the contact utilization value: a higher value of B results in a higher exploration score for a given contact utilization value. Parameter C denotes the minimum exploration score assigned to a given subtype/time pair 324 under analysis. Parameter D controls the sensitivity of the exploration score curve to the unexplored potential value: a higher D value results in a higher exploration score for a given unexplored potential value. According to the disclosed embodiment, the tuning parameters A, B, and D are greater than zero, as the exploration score should increase as the unexplored potential value increases and the contact utilization value decreases. According to this embodiment, the tuning parameter C is greater than 0 but less than 1, as the exploration probability value of $f(\ )$ should be between 0 and 1.

The definitions of the unexplored potential value v( ), contact utilization value u( ) and the need-to-explore value E( ) may differ based on the particular embodiment in which the invention is used. According to an exemplary embodiment, the exploration score function can be mainly based on a customer's 304 contact history, or the service provider's 300 particular configuration, with the option of using recency weighting. The metrics for evaluating customer 304 contact histories are first defined below.

For each customer 304 l, channel subtype 316 cc and time period 320 t, and a sample proportion p, the corresponding RPC rate is defined as $$p = \frac{r}{n},$$

where r is the number of RPCs (r≤n) and n is the number of contact attempts (n≥0). Contact attempts may be weighted according to their recency, so that more value is placed on information obtained from more recent contact attempts than older contact attempts. Recency weighting of contact attempts may be accomplished by defining $w_i$ as the weight of each contact attempt, where $w_i$ is between $w_{min}$ and $w_{max}$; $w_{min} < w_{max}$; and $w_{min}$ and $w_{max}$ are in [0, 1]. According to a preferred embodiment, $w_i$ may be calculated as follows:

$$w_i = w_{min} + \frac{t_i - T_C}{T_T - T_C} \cdot (w_{max} - w_{min}),$$

if $T_C \le t_i \le T_T$ and 0 otherwise. For notational convenience, L may be defined as $T_T - T_C$. For example, L may be set at 1 year, $w_{min}$ set to 0.5, and $w_{max}$ to 1. In the above formulas, $t_i$ is the time period 320 of the contact attempt i, $T_T$ is the time at which the calculations are run, and $T_C$ is the left cutoff time. Contact attempts made before $T_C$ have a weight of 0, and therefore are ignored in this model. Similarly, the model may ignore contact attempts made after $T_T$. The method 200 may run these calculations using "as of dates", meaning $T_T$ values may be used corresponding to dates in the past, and the resulting calculations will be based on contact attempts information available as of that date.

Using the above definitions, the recency-weighted number of contact attempts ($n_w$) may be defined as:

$$n_w(l, cc, t) = \sum_i w_i$$

where i is an index for all contact attempts to the customer l and contact channel cc in the time period t (for example, morning, lunch, afternoon or evening). Similarly, the recency-weighted number of RPCs ($r_w$) is defined as:

$$r_w(l, cc, t) = \sum_j w_j,$$

where j is an index for all RPC contact attempts to the customer l and contact channel cc in time period t.

Now with continued reference to FIGS. 2-3C, in step 208a, the method 200 determines the unexplored potential value v of a channel subtype 316 using the function v( ). According to an exemplary embodiment, the unexplored potential may be defined as the upper end of a confidence interval of actual RPC rates or as an upward potential. This approach may identify subtype/time pairs 324 with a potential of having a high, undiscovered RPC rate. As each contact attempt has only two possible outcomes (RPC or non-RPC), the binomial confidence interval (C.I.) needs to be estimated. For any r and n values where r is the number of RPCs (r≤n) and n is the number of contact attempts (n≥0), a confidence interval $C.I._{\cdot a}=[p_{lower}; p_{upper}]$ is calculated with an a % confidence.

Now with continued reference to FIGS. 2-3C, there are several ways of estimating the confidence interval used by the method 200 in step 208a, depending on the particular embodiment in which the invention is used. The choice of how to estimate the confidence interval may be based on the need for simplicity of approach, or the need for relatively greater accuracy, in the particular embodiment in which the invention is used. For example, one approach may be to use a normal approximation where no recency weighting is used and the number of contact attempts is large enough. This may be the case where n·p>5 and n·(1−p)>5. If a channel subtype 316 has an actual RPC rate of 10%, for example, the normal approximation will become fairly accurate with at least (n=101) contact attempts. The standard error of P, defined as $SE_p$, can be computed as $$SE_p = \sqrt{\frac{p \cdot (1-p)}{n}}.$$

The confidence interval for a desired confidence a is then calculated as:

$$C.I._{\cdot a}=[p_{lower}; p_{upper}]=[p-z_{1-a/2} \cdot SE_p; p+z_{1-a/2} \cdot SE_p]$$

where $z_q$ is the quantile q of the standard normal distribution used to calculate the confidence interval.

With continued reference to FIGS. 2-3C, according to an alternative embodiment, more accurate or "exact" confidence intervals may be calculated in step 208a by employing the Clopper-Pearson method. Computing the confidence intervals is more complicated in this approach than if the normal approximation is used. Computing confidence intervals according to the Clopper-Pearson method is well understood in the art and can be written in many forms, which are omitted from this disclosure for clarity. The Clopper-Pearson method is described in detail in Clopper, C. J.; Pearson, E. S. The Use of Confidence or Fiducial Limits Illustrated in the Case of the Binomial. *Biometrika* 1934, Vol. 26, No. 4, pp. 404-413, the entire disclosure of which is incorporated by reference herein. These calculations need only be run once, and the output may be stored in a lookup table. Using this method, for example, where (n=17) and (r=2), p can be computed as (p=r/n=0.1176471). The confidence interval is $C.I._{\cdot 80\%}$ with an 80% confidence which can be computed as [0.0315; 0.285], corresponding to a an unexplored potential value of $v=p_{upper}(n,r)=0.285$. As another example, if (n=34) and (r=4), then p can be computed the same as before (p=r/n=0.1176471) but the confidence interval is $C.I._{\cdot 80\%}=[0.0522; 0.221]$, corresponding to an unexplored potential value of v=0.221. The results in the example here fulfill the requirements of identifying the subtype/time pairs 324 with a potential of having a high, undiscovered RPC rate. Depending on the circumstances, an RPC rate of 11.76% can be considered either high or low but the unexplored potential is higher in the first example as fewer contact attempts have been made and the subtype/time pair 324 therefore is less likely to be have been fully explored.

For any chosen method for calculating the confidence interval, using recency weighting is optional. If the customer 304 contact history is recency weighted, the unexplored potential defined as the upper end of the confidence interval can be estimated by using a bilinear interpolation. To approximate $p_{upper}(n_w, r_w)$, bilinear interpolation may be used. The following may be defined:

$$n_1 := \lfloor n_w \rfloor \in N$$
$$n_2 := \lceil n_w \rceil \in N$$
$$r_1 := \lfloor r_w \rfloor \in N$$
$$r_2 := \lceil r_w \rceil \in N$$
$$p_{upper}^{11} := p_{upper}(n_1, r_1)$$
$$p_{upper}^{21} := p_{upper}(n_2, r_1)$$
$$p_{upper}^{12} := \begin{cases} 1 & r_2 > n_1 \\ p_{upper}(n_1, r_2) & r_2 \leq n_1 \end{cases}$$
$$p_{upper}^{22} := p_{upper}(n_2, r_2)$$

It should be noted that $p_{upper}(n,r)$ is not defined for r>n. If $n_1=n_2$ and $r_1=r_2$ then $p_{upper}(n_w, r_w)=p_{upper}(n,r)$ as $n_w$ and $r_w$ must both be integers. If $n_1=n_2$ and $r_1 \neq r_2$ then $n_w$ must be an integer and linear interpolation over $r_1$ and $r_2$ is applied:

$$p_{upper}(n_w, r_w) = p_{upper}^{11} + (r_w - r_1) \cdot \frac{p_{upper}^{22} - p_{upper}^{11}}{r_2 - r_1}$$

If $n_1 \neq n_2$ and $r_1=r_2$ then $r_w$ must be an integer and linear interpolation over $n_1$ and $n_2$ is applied:

$$p_{upper}(n_w, r_w) = p_{upper}^{11} + (n_w - n_1) \cdot \frac{p_{upper}^{22} - p_{upper}^{11}}{n_2 - n_1}$$

If $n_1 \neq n_2$ and $r_1 \neq r_2$ then $n_w$ and $r_w$ must both be non-integers and bilinear interpolation is applied:

$$p_{upper}(n_w, r_w) = \frac{1}{(n_2 - n_1) \cdot (r_2 - r_1)} \cdot$$
$$[p_{upper}^{11} \cdot (n_2 - n_w) \cdot (r_2 - r_w) + p_{upper}^{21} \cdot (n_w - n_1) \cdot (r_2 - r_w) +$$
$$p_{upper}^{12} \cdot (n_2 - n_w) \cdot (r_w - r_1) + p_{upper}^{22} \cdot (n_w - n_1) \cdot (r_w - r_1)]$$

With continued reference to FIGS. 2-3C, in step 208b, the method 200 determines the contact utilization value u of a given subtype/time pair 324, which may be defined in an exemplary embodiment as the number of contact attempts in the past (i.e. n) or the number of contact attempts in a recent time period (e.g. the last six months) using that subtype/time pair 324. For example, where the given subtype/time pair 324 has been used five times in the last six-month period, then the method 200 may assign the value 5 to u in step 208b. Other embodiments of the disclosed invention may modify this number using a time-weighting approach, as described above, to place greater emphasis on more recent calls.

Further referring to FIGS. 2-3C, in step 208c, the method 200 may further determine a need to explore value E which can be defined on any level including: customer 304, contact channel type 312, channel subtype 316 or subtype/time pair 324 level. The choice of which level to use may be different based on the particular embodiment in which the invention is used. The E( ) value, as defined, is then used to calculate the exploration score $f( )$ for a given subtype/time pair 324 and may depend on a number of factors based on the embodiment. In the case of the customer service provider 300, for example, these factors may include: whether a customer 304 is delinquent on an account; the customer 304/account priority score; whether the customer service provider has lost touch with the customer 304 (e.g., there has been no RPC in the last six months, or after the last 10 contact attempts); and the availability of alternative contact channel types 312, channel subtypes 316, or time periods 320 for that customer 304. The need to explore value E is based in part, therefore, on the quality of alternative communication means (in terms of RPC history) for the same customer 304. Where an E( ) value is calculated at a customer 304 level, rather than at the subtype/time pair 324 level, the method 200 may still determine an exploration score using that E( ) value for each subtype/time pair 324 of the customer 304.

Further referring to FIGS. 2-3C, according to an exemplary embodiment, the need to explore value E( ) may be defined such that it is based exclusively on the contact history for each customer, wherein having a single high quality (i.e., having a high RPC rate) contact channel type 312, channel subtype 316, or subtype/time pair 324 results in a low value for E( ). Conversely, E( ) may be configured to have a high value if all contact channel types 312, channel subtypes 316, and subtype/time pairs 324 are of low quality. The quality of a contact channel 312, channel subtype 316, or subtype/time pair 324 may be defined differently according to each specific embodiment of the disclosed invention. To define the quality of a contact channel type 312, cc, for example, the quality measure $q_{cc}$ may be based on a recency-weighted RPC rate $$q_{cc} = \frac{\sum_{j:\, all\ contact\ attempts\ with\ an\ RPC} v_j}{\sum_{i:\, all\ contact\ attempts} v_i}$$

where i is an index for all contact attempts and j is an index over for RPC contact attempts, and v, denotes recency weighting of contact as discussed above. It may be useful to employ an even stronger recency weighting approach in this case to put additional emphasis on recent calls. The contact quality of a customer may be defined as $q_j$=max($q_{cc}$) over all cc associated with customer c.

Further referring to FIGS. 2-3C, a quantile of $q_l$, denoted as $Q(q_l)$ may be used to ensure that the need to explore E( ) for a customer 304 is reversely correlated with the number of contacts with the customer 304 relative to other customers 304. The E( ) value for a customer 304 is then defined as a monotonically decreasing function of the quantile of $q_l$ as within a maximum possible value of $E_{max}$. That is, $E(l)=(1-Q(q_l))\cdot E_{max}$. In this example, high values of the quantile function mean that the customer 304 has at least one high-quality contact channel type 312 (or channel subtype 316, or subtype/time pair 324), and low values mean that the customer 304 does not have any high-quality contact channel types 316. $E_{max}$ may be any number between c (minimum exploration probability) and 1, for example $E_{max}$=0.8, being the maximum possible value for the need to explore. Additionally, it may be desirable to add an indicator component to the function so that only contact channel types 312 whose associated customers 304 do not have any associated high-quality contact channel types 312 (defined as a quality of at least $Q_0$), have a chance of having a non-zero "need to explore" value. This may be accomplished by, for example, adjusting the need to explore function to $E(l)=(1-Q(q_l))\cdot E_{max}\cdot I[Q(q_l)<Q_0]$, where I( ) is the indicator function and is 1 if $Q(q_l)<Q_0$ and 0 if $Q(q_l)\geq Q_0$.

With continued reference to FIGS. 2-3C, according to another embodiment of the disclosed invention, a user may fine-tune how aggressively exploration is employed, by determining how many exploratory contact attempts are to be made per time period. However, the number of exploratory attempts per time period only drives the level exploration as a whole. As outlined above, a user can fine-tune the level of exploration for a specified group of customers 304 by manipulating the need for exploration function E( ).

Further referring to FIGS. 2-3C, in step 208d, the method 200 may apply the values determined in steps 208a-c to determine an exploration score for each subtype/time pair 324 for each customer 304 using $$f(u(\ ),v(\ ),E(\ )) = C + E(\ )\cdot \frac{1-C}{1+\exp\!\left(-A\cdot\left(D\cdot v(\ )-\frac{u(\ )}{B}\right)\right)}$$

as described above.

Referring now to FIGS. 1-3C, in step 212, the method 200 may present the results of step 208 (and sub-steps 208a-d, in particular) to a recipient. Presentation of these results and the recipient may vary among embodiments of the disclosed invention. Non-limiting examples of recipients and how the method 200 may present its results to them include: communicating the results to a processor 16 or other component of the system 10 for storage, including in a database; and communicating the results to a server or other system 10 for further processing; or an I/O device 22. The communicated results may be used by another method executable by another system (or the same system 10) to perform a variety of functions. Non-limiting examples of such functions include scheduling programs/modules that schedule contact attempts for a call center or compiling records for later use; or a BTTC module that uses, for example, an exploitative approach.

Figure 4:
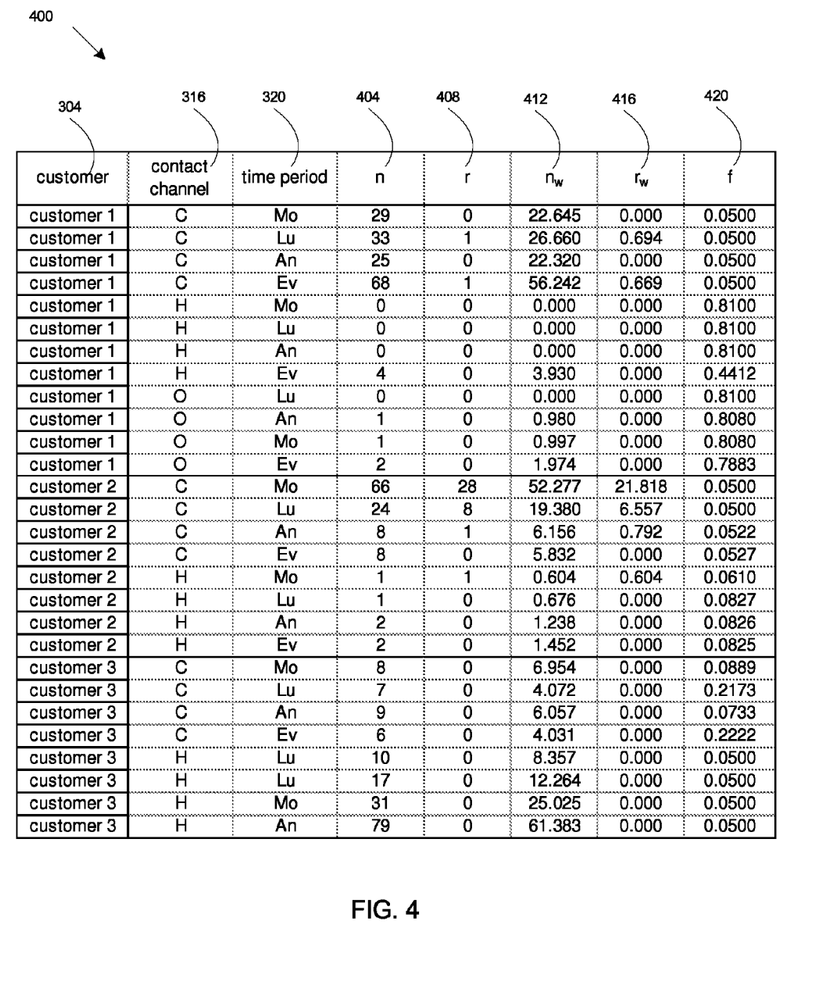
FIG. 4 is a chart depicting results of a series of customer contact attempts using a plurality of contact information and corresponding computed exploration scores, in accordance with an embodiment of the invention.
Figure 5:
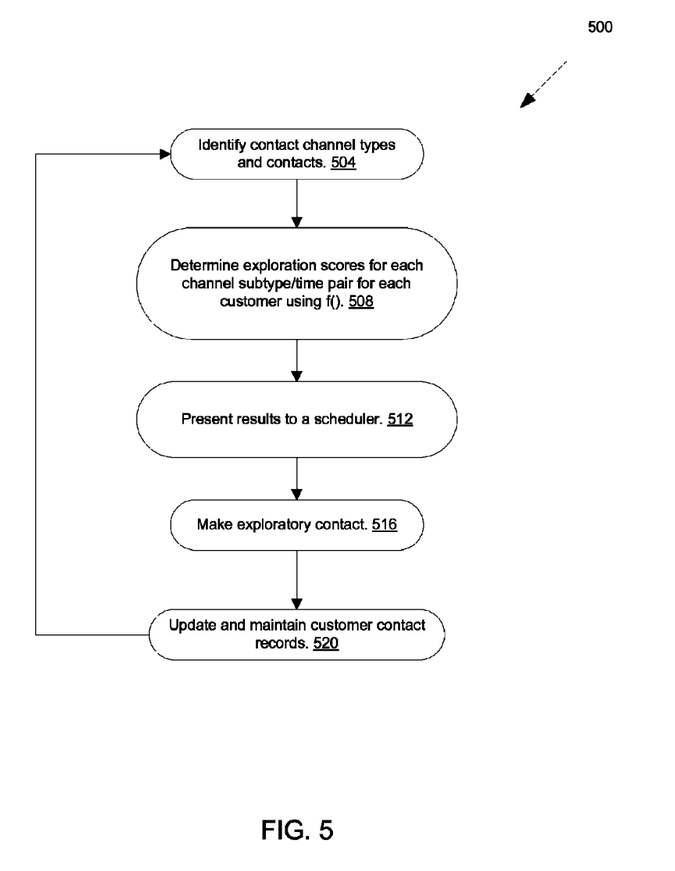
FIG. 5 is a flowchart depicting the steps of a method to regularly compute exploration scores in conjunction with a scheduler to make contact attempts, in accordance with an embodiment of the invention.

Referring now to FIGS. 2-4, and more particularly to FIG. 4, a chart 400 of exploration scores for customers 304 of the customer service provider 300, compiled in accordance with an exemplary embodiment of the disclosed invention, includes the following categories of entries: customers 304 (e.g. a customer 304 ID number); channel subtypes 316; time periods 320; number of contact attempts n 404; number of RPCs r 408; recency-weighted number of contact attempts $n_w$ 412; recency weighted number of RPCs $r_w$ 416; and exploration scores 420 determined using $f( )$, expressed as a decimal value. Information about contact attempts to three customers (1-3) is listed, wherein (C) corresponds to a cell phone number, (O) corresponds to an office phone number, and (H) corresponds to a home phone number. In the case of customer 1, the chart 400 shows historical data for a total of 138 contact attempts n using three channel subtypes 316 (C, H and O phone numbers) and four time periods (Mo, Lu, An, Ev, corresponding to morning, lunch, afternoon and evening hours, as defined and discussed in connection with FIG. 3B, above) resulting in only 2 RPCs r. C has been used more frequently than H and O. The corresponding exploration scores are, therefore, relatively much lower for C across all timer periods 320, but are relatively much higher for all periods of the H and O phone numbers. The exception to this trend for customer 1 is the channel subtype/time pair H/Ev (i.e., home phone number during the evening hours), which shows an exploration score of 0.4412. This anomaly reflects the fact that customer 1 has been contacted using the H number in the evening on four occasions, without any corresponding r gain (i.e., no RPC). Using the chart 400, then, the customer service provider 300 can determine the probability that exploring a given channel subtype/time pair for customer 1 is likely to lead to discovering a channel subtype/time pair having a higher RPC rate.

Referring now to FIGS. 1-3C and 5, a method 500, according to an exemplary embodiment of the disclosed invention, is similar to the method 200 depicted in and described in connection to FIG. 2, with additional steps. In step 504, the method 500 identifies the customer service provider's 300 customers 304 and their contact information, which includes information about each customer's 304 available contact channel types 312, channel subtypes 316, time periods 320, and historical contact information. In step 508, the method 500 determines a set of exploration scores for each subtype/time pair 324 for each customer 304, using $f( )$, as discussed in connection with the method 200 (and more specifically, sub-steps 208a-d thereof). As is the case with the method 200, the method 500 need not receive and/or analyze contact information for every customer 304 (although this may be the case). The method 500 (and the method 200) may instead select a subset of the customer service provider's 300 customers 304 whom the customer service provider 300 wishes to contact at the time the method 500 is performed (or any other time). Moreover, the method 500 may be implemented in conjunction with or as part of a contact scheduling system that initiates both exploitative and exploratory contact attempts. The BTTC model employing an exploitative approach typically uses customers' 304 historical data to determine the best time to contact those customers 304. In doing so, the BTTC model may use subtype/time pairs 324 that have resulted in an RPC rate greater than zero, or a random subtype/time pair 324. By integrating the exploratory approach of the present invention an exploitative approach, the method 500 allows a scheduler to intelligently select a subtype/time pair 324 other than those that would be recommended by the BTTC model, with the added advantage that such intelligent selection is not random and is more likely to yield useful contact information.

With continued reference to FIGS. 1-3C and 5, the method 500 may present (i.e., communicate) its results, directly or indirectly, to a schedule component in step 512. Using these results, the scheduler may determine the subtype/time pair 324 (or simply, a contact channel type 312 or channel subtype 316) to use in making an exploratory contact attempt, and schedules the contact attempt by factoring in other considerations, such as system resources, the confidence level in the BTTC model results for a given customer, logistics, etc. In step 516, the method 500 may make an exploratory contact as scheduled by the scheduler component. The results of the contact attempt may then be used to update the corresponding customer' 304 contact information and history in step 520.

Referring now to FIGS. 2-5, although steps of the method 200 and the method 500 have been sequentially or serially numbered, such numbering is not an indication that such steps must be performed in the order recited, and is merely provided to facilitate clear referencing of the method's steps. The steps of each of these two methods may be performed in a different sequence and/or concurrently, without deviating from the scope or spirit of the disclosed invention. Furthermore, the methods 200 and 500 may be performed periodically, and their results may be used to update the customers' 304 contact information. One advantage of the disclosed invention is that its periodic use of an exploratory model allows it to continue to explore customer behavior and identify contact channel types, contact channels and/or time periods with relatively higher RPC rates. Where the methods 200 and 500 are executed for the first time for one or more customers 304 that have no contact history (or outdated contact histories; e.g. more than six months old), the methods 200 and 500 may use default values. For example, they may prioritize the available contact channel types 312, opting to use a telephone number whenever it is available, or using postal mail only if other contact channel types 312 with potential for more immediate results are unavailable (for e.g., where the only information for a customer 304 is a mailing address). Such default choices may be modeled on RPC rates of other customers, historical data, or other information, and may further be configurable by a user.

Referring generally to FIGS. 2-5, the disclosed invention allows the customer service provider 300 to use the contact information it has for its customers according to an exploratory model, and to select for exploration contact channel types 312, channel subtypes 316, and/or time periods 320 that would not be selected under an exploitative model. Exploitative models, such as the BTTC model, do not systematically contact customers for whom little or no contact history exists, in contrast to the exploratory model of the present disclosure. Additionally, aspects of the exploratory model of the present disclosure provide for continuous exploration of existing and new ways of reaching customers, thereby adapting to their changing habits and patterns of availability.

While embodiments of the invention are recited with reference to a customer service provider processing customer accounts, additional exemplary embodiments of the disclosed invention performing the steps and functions stated above may include, without limitation: banks, credit card and student loan servicers, insurance providers, advertisers and marketing firms, survey providers, customer service providers, pollsters, political and social campaigns, collections agencies, call centers, and social media outlets.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for evaluating contact information, comprising:

selecting a plurality of contacts having a plurality of contact channels and time periods;

determining a set of exploration scores for each of the plurality of contacts by analyzing a usefulness of corresponding contact channels and time periods for making exploratory contact attempts; and presenting the set of exploration scores to a recipient for making a contact attempt to each of the plurality of contacts, wherein at least one of the above steps is performed using a computer.

2. The method of claim 1, wherein the set of exploration scores for each contact includes a plurality of exploration scores for one or more contact channel/time period pairs of that contact.

3. The method of claim 1, wherein the set of exploration scores is determined by an exploration score function comprising steps of:

determining at least one unexplored potential value, contact utilization value, and need to explore value for each contact; and determining the set of exploration scores for the plurality of contacts based on each contact's unexplored potential value, contact utilization value, and need to explore value, according to an exploration criteria.

4. The method of claim 3, wherein the exploration criteria is configurable by a user.

5. The method of claim 1, wherein the plurality of contact channels include e-mail, postal mail, telephone, telefax, text message, or instant messenger.

6. The method of claim 1, wherein the method is performed periodically according to a configurable schedule.

7. The method of claim 1, wherein the recipient is a scheduler making a plurality of exploratory contact attempts based on the set of exploration scores.

8. The method of claim 7, wherein the scheduler further makes a plurality of exploitative contact attempts based on recommendations from a best time to contact module using a set of results from the plurality of exploratory contact attempts.

9. A system for evaluating contact information, comprising:
- a computer having a processor, and a computer-readable storage device; and
- a program embodied on the storage device for execution by the processor, the program having a plurality of program modules, including:
  - a selecting module configured to select a plurality of contacts having a plurality of contact channel and time periods;
  - a determining module configured to determine a set of exploration scores for each of the plurality of contacts using the corresponding contact channels and time periods; and
  - a presenting module configured to present the set of exploration scores to a recipient for making a contact attempt to each of the plurality of contacts.

10. The system of claim 9, wherein the set of exploration scores determined for each contact by the determining module includes a plurality of exploration scores for one or more contact channel and time period pairs of that contact.

11. The system of claim 9, wherein the determining module is further configured to determine the set of exploration scores for each contact according to an exploration score function having an unexplored potential value, a contact utilization value, and a need to explore value modified according to an exploration criteria.

12. The system of claim 11, wherein the presenting module of the program communicates with a call center.

13. A computer program product for evaluating contact information, the computer program product comprising a non-transitory computer-readable storage medium having program code embodied therewith, the program code readable/executable by a processor of a computer to perform a method comprising:
- selecting a plurality of contacts, by the processor, the plurality of contacts having a plurality of contact channels and time periods;
- determining a set of exploration scores for each of the plurality of contacts, by the processor, using the corresponding contact channels and time periods; and
- presenting the set of exploration scores, by the processor, to a recipient for making a contact attempt to each of the plurality of contacts.

14. The computer program product of claim 13, wherein the set of exploration scores for each contact includes a plurality of exploration scores for one or more contact channel/time period pairs of that contact.

15. The computer program product of claim 13, wherein the determining step of the method further includes:
- determining a result of an exploration score function, by the processor, based on at least one unexplored potential value, contact utilization value, and need to explore value for each contact, according to an exploration criteria.

16. The computer program product of claim 15, wherein the exploration criteria is configurable by a user.

17. The computer program product of claim 13, wherein the plurality of contact channels includes email, postal mail, telephone, telefax, text message, or instant messenger.

18. The computer program product of claim 13, wherein the method is performed periodically according to a configurable schedule.

19. The computer program product of claim 13, wherein the recipient is a scheduler making a plurality of exploratory contact attempts based on the set of exploration scores.

20. The computer program product of claim 19, wherein the scheduler further makes a plurality of exploitative contact attempts based on recommendations from a best time to contact module using a set of results from the plurality of exploratory contact attempts.

* * * * *